(12) United States Patent
Hurley et al.

(10) Patent No.: US 11,961,018 B2
(45) Date of Patent: Apr. 16, 2024

(54) SYSTEMS AND METHODS FOR MATCHING TRANSPORTATION REQUESTOR DEVICES WITH AUTONOMOUS VEHICLES

(71) Applicant: Lyft, Inc., San Francisco, CA (US)

(72) Inventors: Gavin Sebastian Hurley, San Francisco, CA (US); Leighton Kamaile Jen, Redwood City, CA (US); Jody Metzenbaum Kelman, San Francisco, CA (US); Rex See Chun Lam, San Francsico, CA (US); Jonathan Patrick O'Keefe, Oakland, CA (US); Oleg Vadim Panichev, San Francisco, CA (US); Arkesh Jagdish Patel, San Francisco, CA (US); John Robert Tighe, San Francisco, CA (US); Adam Alexander Wolf, San Francsico, CA (US)

(73) Assignee: Lyft, Inc., San Francisco, CA (US)

( * ) Notice: Subject to any disclaimer, the term of this patent is extended or adjusted under 35 U.S.C. 154(b) by 7 days.

(21) Appl. No.: 17/550,987

(22) Filed: Dec. 14, 2021

(65) Prior Publication Data
US 2022/0138638 A1 May 5, 2022

Related U.S. Application Data

(63) Continuation of application No. 16/686,077, filed on Nov. 15, 2019, now Pat. No. 11,232,375.

(51) Int. Cl.
*G06Q 10/02* (2012.01)
*G06Q 50/30* (2012.01)
(Continued)

(52) U.S. Cl.
CPC .............. *G06Q 10/02* (2013.01); *G06Q 50/30* (2013.01); *H04W 4/021* (2013.01); *H04W 4/40* (2018.02)

(58) Field of Classification Search
CPC .............................. G06Q 10/02; G06Q 50/30
See application file for complete search history.

(56) References Cited

U.S. PATENT DOCUMENTS

2016/0370194 A1* 12/2016 Colijn .................... G08G 1/202

OTHER PUBLICATIONS

Li, Xin, et al. "Modeling an enhanced ridesharing system with meet points and time windows." PloS one 13.5 (2018): e0195927. (Year: 2018).*

* cited by examiner

*Primary Examiner* — Emmett K. Walsh
(74) *Attorney, Agent, or Firm* — Greenberg Traurig, LLP

(57) ABSTRACT

The disclosed computer-implemented method may include identifying and notifying requestors that may be candidates for a particular autonomous vehicle in order to find those candidates that may be willing or able to relax their travel constraints to match the autonomous vehicle. A request flow may involve surfacing the potential option of matching to an autonomous vehicle before setting a specific destination. For example, the request flow may involve determining that an autonomous vehicle is sufficiently near an in-session potential requestor. Before the potential requestor enters a specific destination, the request flow may present the possibility of the potential requestor being matched with the autonomous vehicle. In some examples, the request flow may then provide available drop-off locations that are compatible with the autonomous vehicle for selection by the potential requestor. Various other methods, systems, and computer-readable media are also disclosed.

20 Claims, 12 Drawing Sheets

(51) Int. Cl.
*H04W 4/021* (2018.01)
*H04W 4/40* (2018.01)

SYSTEMS AND METHODS FOR MATCHING TRANSPORTATION REQUESTOR DEVICES WITH AUTONOMOUS VEHICLES

CROSS REFERENCE TO RELATED APPLICATION

This application is a continuation of U.S. application Ser. No. 16/686,077, filed 15 Nov. 2019, the disclosure of which is incorporated in its entirety by this reference.

BACKGROUND

Some transportation services may provide transportation on demand, drawing from a transportation provider supply pool to meet the needs of those requesting transportation services as the needs arise. The transportation provider supply pool may include autonomous transportation provider vehicles that are capable of providing transportation without a human operator as well as non-autonomous vehicles that require a human operator. Autonomous transportation provider vehicles may offer many benefits over non-autonomous vehicles, including efficiency and safety.

In some cases, autonomous transportation provider vehicles may be hampered by technical or regulatory limitations that prevent autonomous transportation provider vehicles from picking up or dropping off transportation requestors at some locations. Such limitations may decrease the utilization of autonomous transportation provider vehicles. The underutilization of autonomous transportation provider vehicles may cause transportation network inefficiencies. Accordingly, the instant disclosure identifies and addresses a need for additional and improved systems and methods for matching transportation requestor devices with autonomous vehicles.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
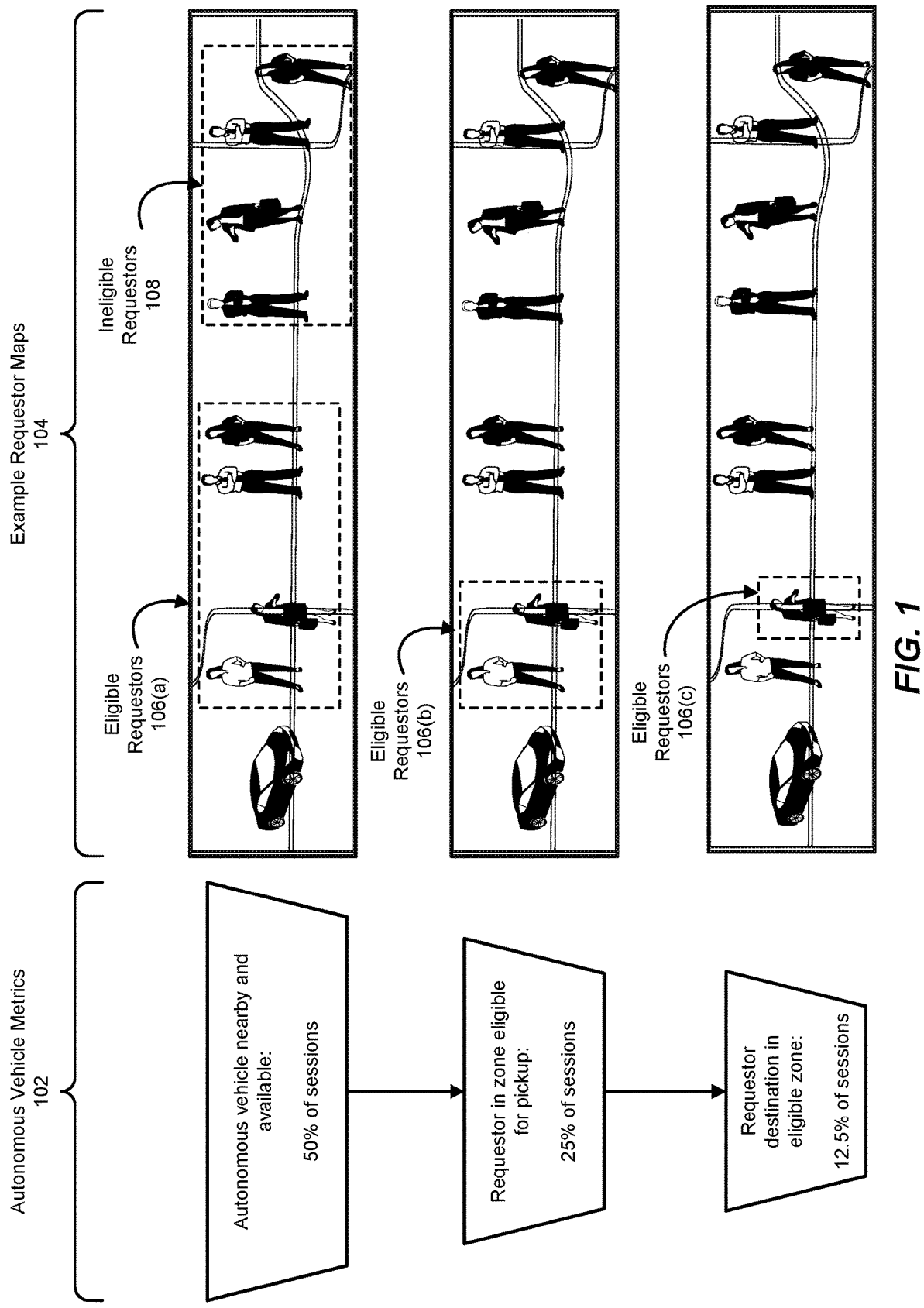
FIG. 1 is an illustration of example potential autonomous vehicle requestors and constraints.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a method for identifying and notifying requestors that may be candidates for a particular autonomous or semi-autonomous vehicle in order to find those candidates that may be willing or able to relax their travel constraints to match with the autonomous vehicle. Autonomous vehicle systems may be subject to a number of technical and regulatory constraints that limit the pickup, drop-off, and drivable areas that such vehicles are capable and/or allowed to operate. For example, only particular locations may be suitable for pickup and/or drop-off due to the traffic flow around the location, interaction of the sidewalk or loading point with the road, and/or configuration of the potential loading area. Further, depending on the specific type, operator, software and hardware versions, and capabilities of the various autonomous vehicles that may be available for a request, these constraints may change for a given region location, and/or vehicle such that some vehicles, versions, and providers/manufacturers may have different suitable pickup or drop-off locations associated with them. Accordingly, it can be difficult to match autonomous vehicles to requestors, lowering utilization of autonomous vehicles in the network and potentially wasting the autonomous vehicles as a transportation resource. In order to broaden the pool of potential requestors who might be matched to an autonomous vehicle, a request flow may involve surfacing the potential option of matching to an autonomous vehicle before setting a specific destination. For example, the request flow may involve determining that an autonomous vehicle is sufficiently near an in-session potential requestor (e.g., within a six-minute, eight-minute, fifteen minute, or any other suitable period of estimated time of arrival and/or within one mile, two miles, five miles, or any other suitable distance). Before the potential requestor enters a specific destination, the request flow may present the possibility of the potential requestor being matched with the autonomous vehicle. In some examples, the request flow may then provide available drop-off locations that are compatible with the autonomous vehicle for selection by the potential requestor (e.g., using a map showing drop-off areas, one or more tumblers for selecting an available drop-off location, and/or any other suitable interface that allows a requestor to quickly and easily select a potential location or area).

In some examples, the method may include determining whether a potential requestor is a likely candidate for matching to the nearby available autonomous vehicle. For example, the method may predict a drop-off location for the potential requestor that is compatible with drop-off areas for the autonomous vehicle, may determine that the potential requestor is likely willing to walk and/or use other multi-modal resources to reach a compatible pick-up location and/or to reach a final destination from a compatible drop-off location, and/or may identify an interest in autonomous vehicles on the part of the potential requestor. In some examples, the method may also include determining how a match with the potential requestor would impact utilization of the autonomous vehicle and/or determining whether to present the option to use the autonomous vehicle based on optimizing autonomous vehicle utilization across an area or region and/or other system objectives.

Accordingly, as may be appreciated, the systems and methods described herein may improve the functioning of a computer that manages a dynamic transportation matching system by improving matches between transportation requestors and transportation resources within the transportation network such that (i) transportation requestors that are likely to be interested in using autonomous vehicles are matched to autonomous vehicles and/or presented with an option to match an autonomous vehicle when that autonomous vehicle is available and a good match for the requestor and (ii) autonomous vehicles and non-autonomous vehicles are more efficiently used within the transportation network. Furthermore, for the reasons mentioned above and to be discussed in greater detail below, the systems and methods described herein may provide advantages to the field of transportation by increasing the utilization of autonomous transportation provider vehicles and the efficient allocation of non-autonomous transportation provider vehicles (e.g., to transportation tasks that autonomous vehicles are not able or well-suited to perform). More efficient and/or better allocated available transportation resources throughout a region may lead to fewer canceled requests, higher throughput of successful transportation matches, and lower wait times for requestors across a region.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include rideable vehicles, also referred to as personal mobility vehicles (PMVs) and/or micro-mobility vehicles (MMVs), that are not bound to traditional road lanes, such as scooters, bicycles, electric scooters, electric bicycles, and/or any other suitable type of PMV and/or MMV. In some embodiments, a dynamic transportation network may include autonomous vehicles (e.g., self-driving cars and/or self-driving scooters) that may be capable of operating with little or no input from a human operator. Additionally or alternatively, a dynamic transportation network may include semi-autonomous vehicles that may be capable of operating with reduced input from a human operator compared to non-autonomous vehicles. For example, a semi-autonomous vehicle may have functions such as lane assist and/or automated parking.

FIG. 1 illustrates example potential autonomous vehicle requestors and constraints. In some examples, as illustrated by autonomous vehicle metrics 102, a significant proportion (e.g., 50%) of sessions (e.g., instances of dynamic transportation requestor applications open on devices) may be eligible for transportation via an autonomous vehicle ("AV") if the only constraint is that the AV is available (e.g., has open seats and/or is not transporting another requestor depending on the mode or settings of the current ride) and nearby (e.g., able to reach the transportation requestor within a short time, such as within ten minutes, within eight minutes, within five minutes, etc.). For example, eligible requestors 106(a) in example requestor maps 104 may all be eligible for transport via autonomous vehicles while other requestors may not be eligible. However, in some examples, a smaller proportion of sessions (e.g., only 23%) may correspond to requestors currently located in zones that are eligible for pickup by an AV, due to regulatory and/or technical limitations. For example, eligible requestors 106(b) may be located in pickup zones. In some examples, sessions with requestors who request transportation to a destination that is within an eligible drop-off zone may form an even smaller proportion of sessions (e.g., only 8%). For example, requestors 106(c) may be the only requestor or requestors eligible for transportation by a nearby AV from a pickup zone to a drop-off zone. The figures in autonomous vehicle metrics 102 may represent a general trend rather than specific numbers, whereby each successive constraint eliminates a large portion of available requestors until a small percentage of transportation requestors are eligible for transportation via an AV. In some cases, this may result in AVs spending time idle rather than transporting transportation requestors and/or other transportation network inefficiencies. However, by relaxing various constraints—such as the requirement to be in an eligible pickup zone and/or the requirement to be traveling to an eligible drop-off zone—the systems described herein may increase the utilization of AVs, providing benefits to the transportation network.

FIG. 1 illustrates example potential autonomous vehicle requestors and constraints. In some examples, as illustrated by autonomous vehicle metrics 102, a significant proportion (e.g., 50%) of sessions (e.g., instances of dynamic transportation requestor applications open on devices) may be eligible for transportation via an autonomous vehicle ("AV") if the only constraint is that the AV is available (e.g., has open seats and/or is not transporting another requestor depending on the mode or settings of the current ride) and nearby (e.g., able to reach the transportation requestor within a relatively short time based on ensuring reasonable utilization of the autonomous vehicle and the availability of other transportation resources to a potential requestor. Depending on the current network conditions and availability of other available transportation resources and providers, this nearby time may change over time and place, such as, for example, ten minutes, eight minutes, five minutes, 3 minutes, etc.). For example, eligible requestors 106(a) in example requestor maps 104 may be eligible for transport via autonomous vehicles while ineligible requestors may not be eligible due to an autonomous vehicle not being either available or not being available within that particular distance or time. For example, a smaller proportion of requestor sessions (e.g., only 25%) may correspond to requestors currently located in zones that are eligible for pickup by an AV, due to regulatory and/or technical limitations. For example, eligible requestors 106(b) may be located in pickup zones. In some examples, sessions with requestors who request transportation to a destination that is within an eligible drop-off zone may form an even smaller proportion of sessions (e.g., only 12.5%). For example, requestors 106(c) may be the only requestor or requestors eligible for transportation by a nearby AV from a pickup zone to a drop-off zone. The figures in autonomous vehicle metrics 102 may represent a general trend rather than specific numbers, whereby each successive constraint eliminates a large portion of available requestors until a small percentage of transportation requestors are eligible for transportation via an AV. In some cases, this may result in AVs spending time idle rather than transporting transportation requestors and/or other transportation network inefficiencies. However, by relaxing various constraints—such as the requirement to be in an eligible pickup zone and/or the requirement to be traveling to an eligible drop-off zone—the systems described herein may increase the utilization of AVs, providing benefits to the transportation network. In some examples, increasing AV utilization may decrease system inefficiencies and/or maximize the number of rides facilitated by the dynamic transportation matching system.

Figure 2:
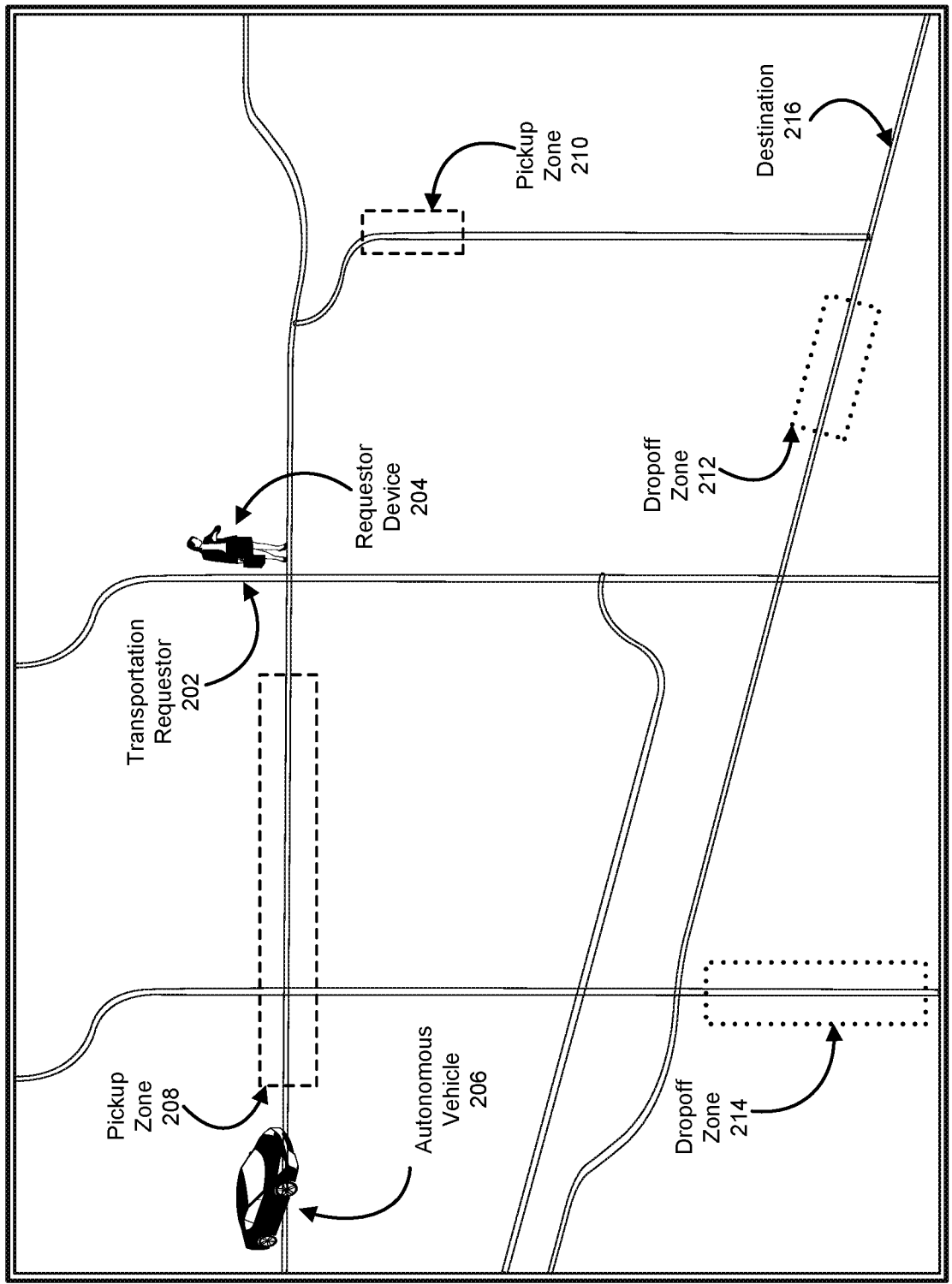
FIG. 2 is an illustration of an example transportation requestor and autonomous vehicle.

FIG. 2 illustrates an example transportation requestor and autonomous vehicle. In this example, a transportation requestor 202 may open a session of a dynamic transportation application on a requestor device 204. Based on transportation requestor 202 opening the session of the dynamic transportation application, the systems described herein may predict that transportation requestor 202 is likely to initiate a transportation request. In one example, transportation requestor 202 may be within pickup range (e.g., within a five-minute estimated arrival time [ETA], ten minute ETA, two mile distance, three mile distance, and/or any other suitable ETA and/or distance) of an AV 206. However, in some examples, AV 206 may be constrained to only pick up transportation requestors in pickup zone 208 and/or pickup zone 210. The term "pickup zone," in some examples, may refer to an area where an AV is able to pick up a transportation requestor. In some embodiments, pickup zones may range in size (e.g., from a parking space to several blocks). In some examples, pickup zones may be static (i.e., may not change over time), while in other examples pickup zones may change based on factors such as time of day, day of week, traffic, weather, and/or other relevant conditions. In some embodiments, AV 206 may be constrained to only drop off transportation requestors in drop-off zone 212 and/or drop-off zone 214. The term "drop-off zone," in some examples, may refer to an area where an AV is able to drop off a transportation requestor. In some examples, drop-off zones may vary in size and/or may be static and/or dynamic, similar to the description of pickup zones provided above. In some embodiments, pickup and drop-off zones for an autonomous vehicle may be the same; i.e., any zone that is an eligible pickup zone may also be an eligible drop-off zone, and vice versa. In other embodiments, pickup and drop-off zones may be separate types of zones that may sometimes, but not always, overlap. For example, an airport may have separate pickup and drop-off zones, while a hotel may have a zone that is eligible for both pickups and drop-offs. In some examples, the term "eligible zone" may refer to a zone that is eligible for pickups, drop-offs, or both. In some embodiments, an eligible zone may be generated automatically based on various characteristics such as regulatory constraints, AV characteristics, map characteristics, and/or any other suitable characteristics. Additionally or alternatively, an eligible zone may be defined manually.

In some examples, transportation requestor 202 may not be located within a pickup zone and thus may not ordinarily be eligible for transportation via AV 206 despite being within the pickup range of AV 206. Additionally or alternatively, transportation requestor 202 may have a destination 216 that may not be within a drop-off zone and thus may not be eligible for transportation via AV 206. In some examples, transportation requestor device 204 may be matched with a non-autonomous transportation provider vehicle, leaving AV 206 idle and inefficiently using transportation network resources. Accordingly, as will be described below, the systems and methods described herein may provide transportation request flows that identify more potential matches for autonomous vehicles.

Figure 3:
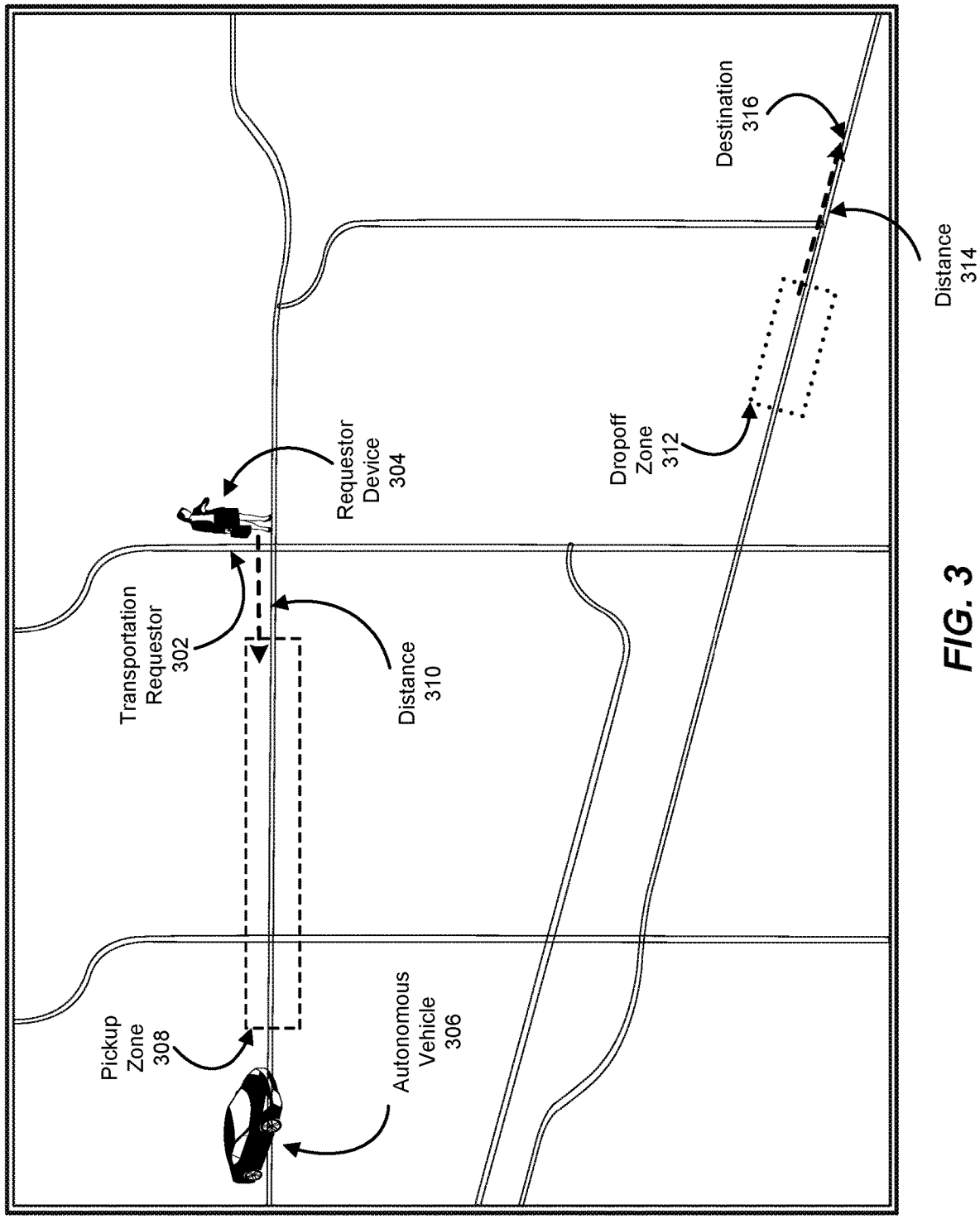
FIG. 3 is an additional illustration of an example transportation requestor and autonomous vehicle.

FIG. 3 is an additional illustration of an example transportation requestor and autonomous vehicle. In some examples, a transportation requestor 302 may open a session of a dynamic transportation application on a requestor device 304 and/or perform any other action (e.g., opening a menu within the dynamic transportation application) that causes the systems described herein to determine that requestor device 304 is likely to initiate a request for transportation. In one embodiment, the systems described herein may determine that requestor device 304 is within range of an AV 306 and also within a distance 310 (e.g., a predicted acceptable travel distance) of a pickup zone 308 and may, in response to making this determination, cause requestor device 304 to display an option for transportation requestor 302 to be transported by AV 306. In some examples, the term "predicted acceptable travel distance" may refer to a distance that the systems described herein predict that a transportation requestor associated with a requestor device will be willing and able to travel to be picked up by an AV. In some embodiments, a predicted acceptable travel distance may have a set threshold for maximum distance and/or travel time, such as, for example, five minutes, 3 minutes, 1 minute, etc. or 2 blocks, 10 blocks, or half a mile. Additionally or alternatively, the systems described herein may calculate a predicted acceptable travel distance based on characteristics of a transportation requestor and/or situation, such as historical transportation behavior, time of day, weather, type of terrain, and/or any other suitable characteristic. In some embodiments, a transportation requestor may opt out of having the above data factored into matching and/or option display decisions. For example, the systems described herein may predict that a particular transportation requestor will be willing to walk for five minutes to be picked up by an AV in a suitable pickup zone or location for the AV while another transportation requestor may only be willing to walk for two minutes. In another example, the systems described herein may predict that a transportation requestor may be willing to walk for five minutes during daylight in good weather but may not be willing to walk any distance at night or in inclement weather. In some embodiments, the systems described herein may identify a level of interest of the transportation requestor in being transported by an AV (e.g., based on previous selections and/or an explicit preference set via the requestor device). In some examples, the systems described herein may be more likely to suggest an AV to a requestor with a higher level of interest in AVs and/or may predict a longer acceptable travel distance for transportation requestors with a higher level of interest in AVs. For example, a transportation requestor with a low level of interest in AVs may only be willing to walk two minutes to be transported by an AV while a transportation requestor with a high level of interest in AVs may be willing to walk ten minutes and/or take multi-modal transportation (e.g., a bus, a scooter, etc.) to be transported by an AV.

In some embodiments, the systems described herein may cause requestor device 304 to display an option to be transported by AV 306 to any of a list of drop-off zones. In one example, transportation requestor 302 may have a destination 316 that is a distance 314 away from a drop-off zone 312 and may send a message to the dynamic transportation matching system selecting drop-off zone 312. In some embodiments, the systems described herein may predict that requestor device 304 will request transportation to destination 316 based on various factors, such as a transportation request history associated with requestor device 304. For example, if requestor device 304 requests transportation to destination 316 almost every weekday at 5 p.m. and it is currently a weekday at 5 p.m., the systems described herein may predict that requestor device 304 will request transportation to destination 316 and, based on destination 316 being within a predicted acceptable travel range of drop-off zone 312, cause requestor device 304 to display an option for transportation via AV 306. In some embodiments, the systems described herein may calculate the effect on AV utilization before sending the requestor device the option to be transported by the AV. For example, if the systems described herein predict that AV 306 is likely to be matched with another requestor soon (e.g., due to historical request patterns), the systems described herein may not present the option to match with AV 306. However, if the systems described herein predict that AV 306 is likely to remain idle if not matched with requestor device 304, the systems described herein may present the option for requestor device 304 to match with AV 306. By relaxing the constraints for pick-up and/or drop-off zones, the systems described herein may facilitate the transportation of transportation requestor 302 via AV 306, increasing AV utilization and improving transportation network efficiency.

Figure 4:
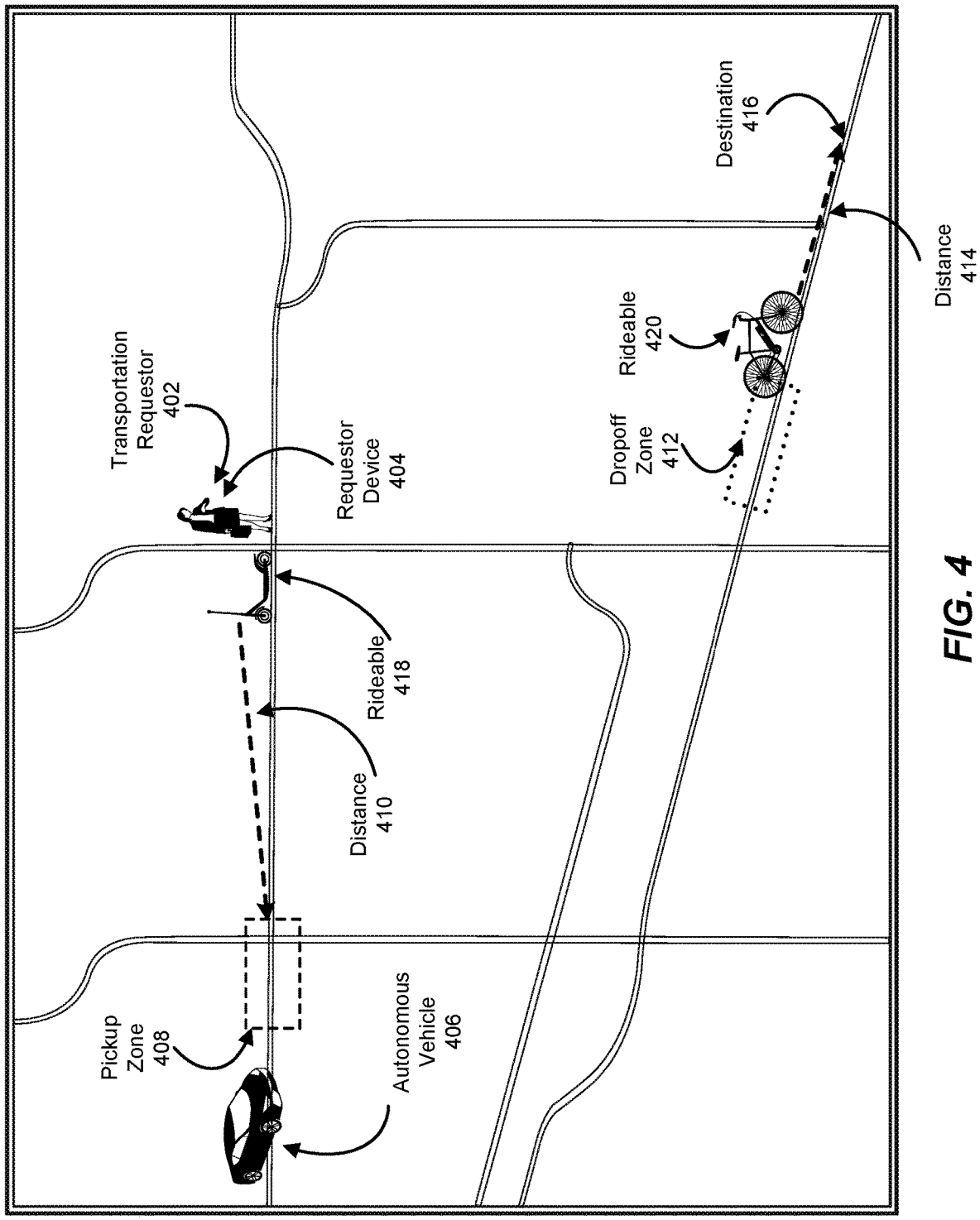
FIG. 4 is an illustration of an example transportation requestor and autonomous vehicle with rideable vehicles.

In some embodiments, the systems described herein may increase predicted acceptable travel range by factoring in additional modes of transportation, such as public transit and/or rideable (e.g., micro-mobility) vehicles. FIG. 4 illustrates an example transportation requestor and autonomous vehicle with rideable vehicles. In one example, a transportation requestor 402 may open a session with a dynamic transportation application on a requestor device 404. In some embodiments, the systems described herein may determine that requestor device 404 is in pickup range of AV 406. In one example, the systems described herein may determine that requestor device 404 is within a distance 410 of a pickup zone 408 and that distance 410 is a predicted acceptable travel distance if transportation requestor 402 traverses distance 410 via a rideable 418. In some embodiments, rideable 418 may be associated with the dynamic transportation network. Additionally or alternatively, rideable 418 may not be associated with the dynamic transportation network but the dynamic transportation matching system may have information about the location and/or availability of rideable 418. In some examples, the systems described herein may direct transportation requestor 402 via requestor device 404 to traverse distance 410 via rideable 418 to meet AV 406. Similarly, transportation requestor 402 may have a destination 416 that may be a distance 414 from a drop-off zone 412 and the systems described herein may suggest that transportation requestor 402 traverse distance 414 via a rideable 420. In some embodiments, the systems described herein may reserve rideable 418 and/or 420 to requestor device 404 upon matching requestor device 404 with AV 406. In some examples, the systems described herein may direct transportation requestors to public transit and/or other transportation networks in addition to or as an alternative to rideable vehicles to extend the distance that a transportation requestor is able to travel to or from a pick up and/or drop-off zone.

Figure 5:
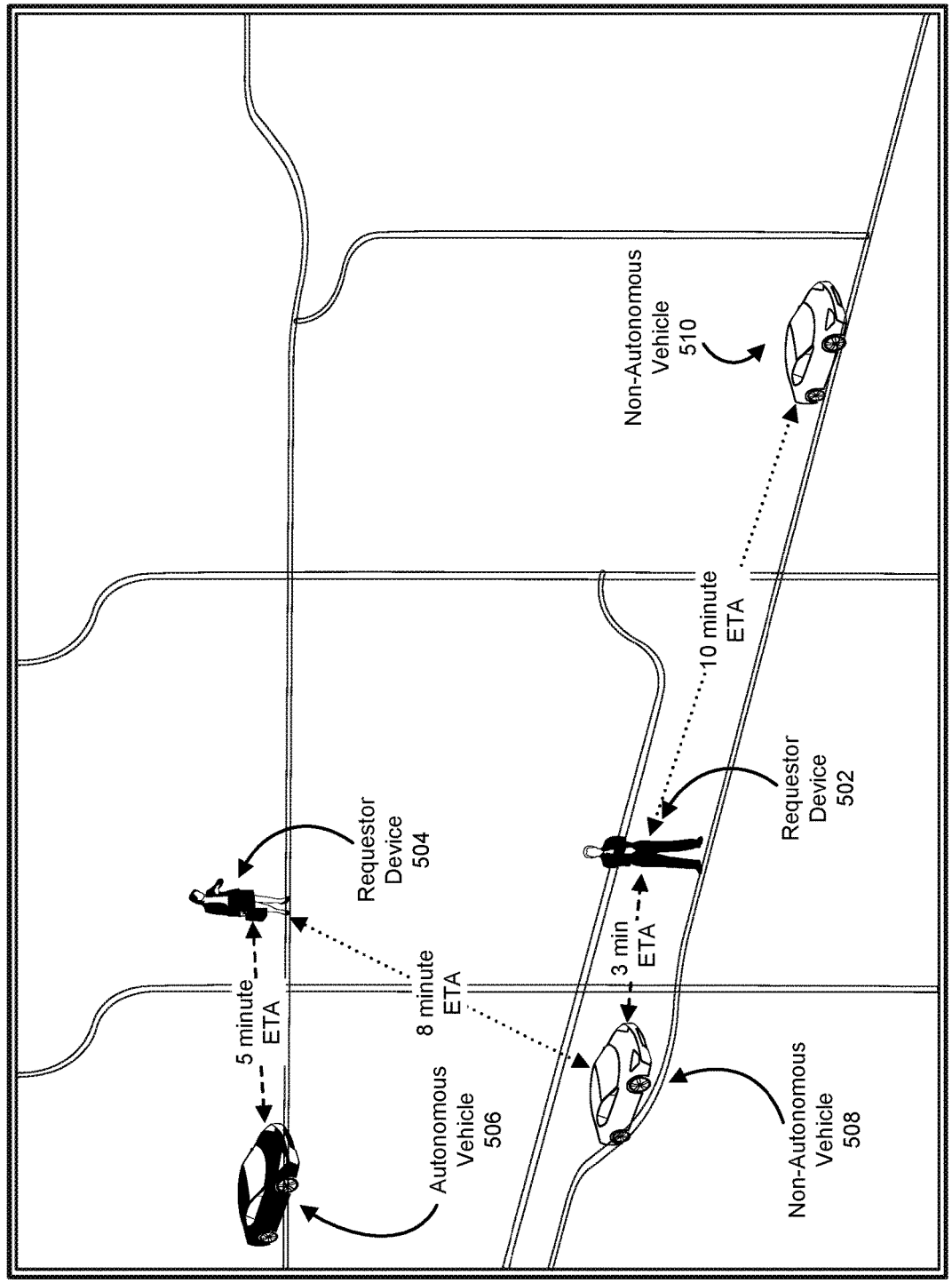
FIG. 5 is an illustration of multiple example transportation requestors and providers.

In some embodiments, relaxing AV constraints in order to match a transportation requestor device with an AV may have beneficial effects for the dynamic transportation network and/or other transportation requestors and/or providers. FIG. 5 illustrates multiple example transportation requestors and providers. In one example, the systems described herein may detect that a session of a dynamic transportation application is open on a requestor device 504. If the systems described herein do not display an option to select an AV to requestor device 504, in some examples requestor device 504 may be matched with a non-autonomous vehicle 508 with an eight minute ETA, causing a requestor device 502 to be matched with a non-autonomous vehicle 510 with a ten-minute ETA due to the closer non-autonomous vehicle 508 being matched to requestor device 504. In some examples, a nearby AV 506 may be idle. Instead, if the systems described herein relax pickup zone and/or drop-off zone constraints to match requestor device 504 with AV 506, non-autonomous vehicle 508 may be free to be matched with requestor device 502, improving the ETA for requestor device 502 to three minutes and the ETA for requestor device 504 to five minutes. Thus, by relaxing AV matching constraints, the systems described herein may improve AV utilization, network efficiency, and user experience.

Figure 6:
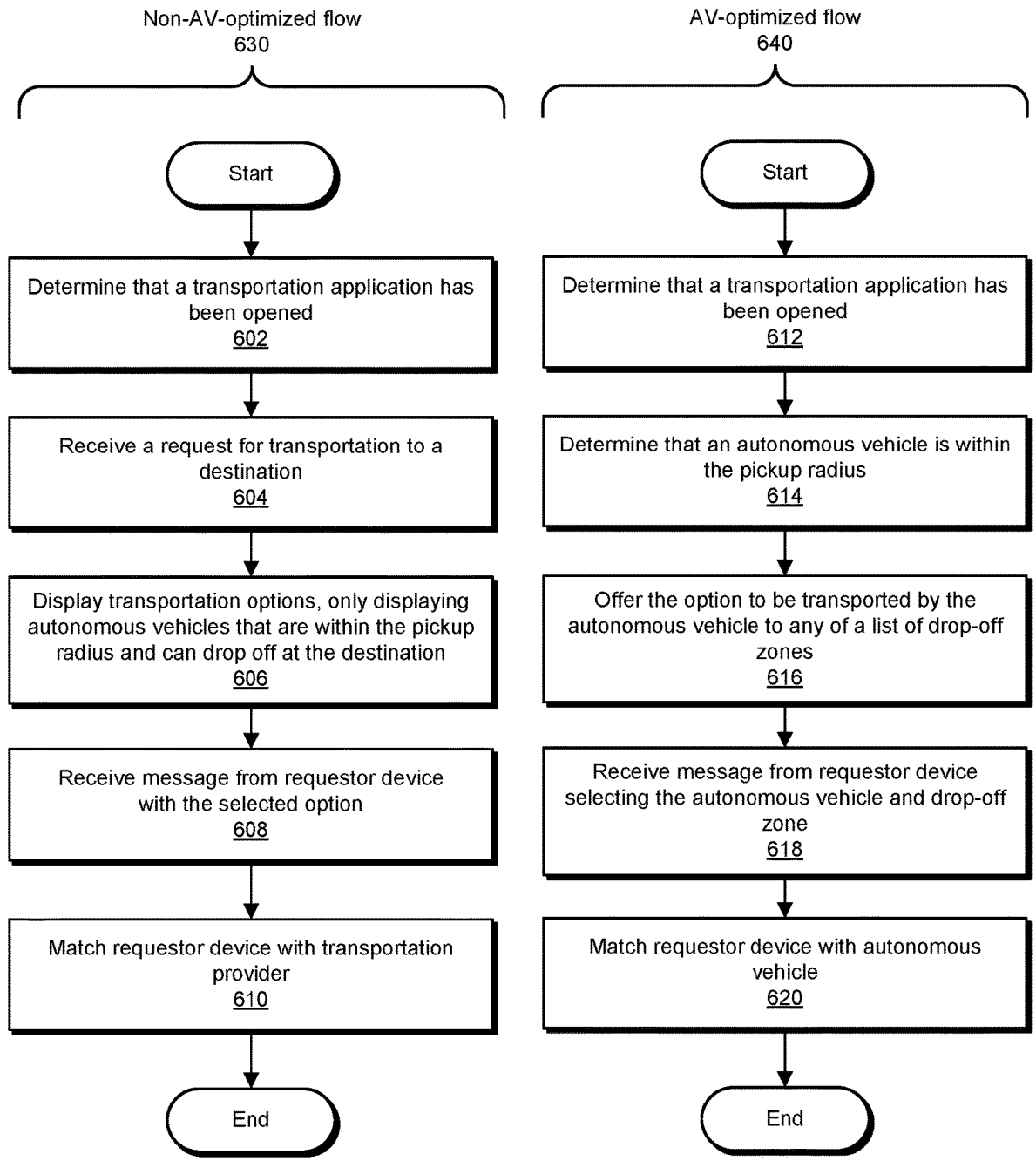
FIG. 6 is a flow diagram of example methods for matching transportation requestors and providers.

FIG. 6 is a flow diagram of example methods for matching transportation requestors and providers. In some examples, in a non-AV optimized flow 630, at step 602 the systems described herein may determine that a dynamic transportation application has been opened on a device. At step 604, the systems described herein may receive a request for transportation to a destination. At step 606, the systems described herein may display transportation options (e.g., shared ride, single ride, deluxe ride, etc.), potentially only displaying AVs as an option if an AV is in range, the requestor is within a pickup zone, and the destination is within a drop-off zone. At step 608, the systems described herein may receive a message from the requestor device with the selected option. At step 610, the systems described herein may match the requestor device with a transportation provider.

In some examples, in an AV-optimized flow 640, at step 612 the systems described herein may determine that a transportation application has been opened on a device. At step 614, the systems described herein may determine that an AV is within a pickup radius of the device. At step 616, before a destination has been selected on the device, the systems described herein may offer an option for the potential transportation requestor to be transported by an AV to any of a list of drop-off zones associated with the AV. At step 618, the systems described herein may receive a message from the requestor device selecting the option to be transported by the AV and a drop-off zone to which to be transported. At step 620, the systems described herein may match the requestor device with the AV.

In some examples, the systems described herein may determine that more potential requesters are available than AVs. In these examples, the systems described herein may determine which transportation requestor devices to present AV options based on requestor interest in AVs (e.g., preferentially show AV options to requestors with a higher interest in AVs), transportation network efficiency (e.g., would matching a particular requestor with an AV reduce overall ETAs, improve the availability of another transportation provider, and/or improve other metrics), and/or overall AV utilization (e.g., preferentially matching requestors with longer trips to minimize AV idle time).

Figure 7:
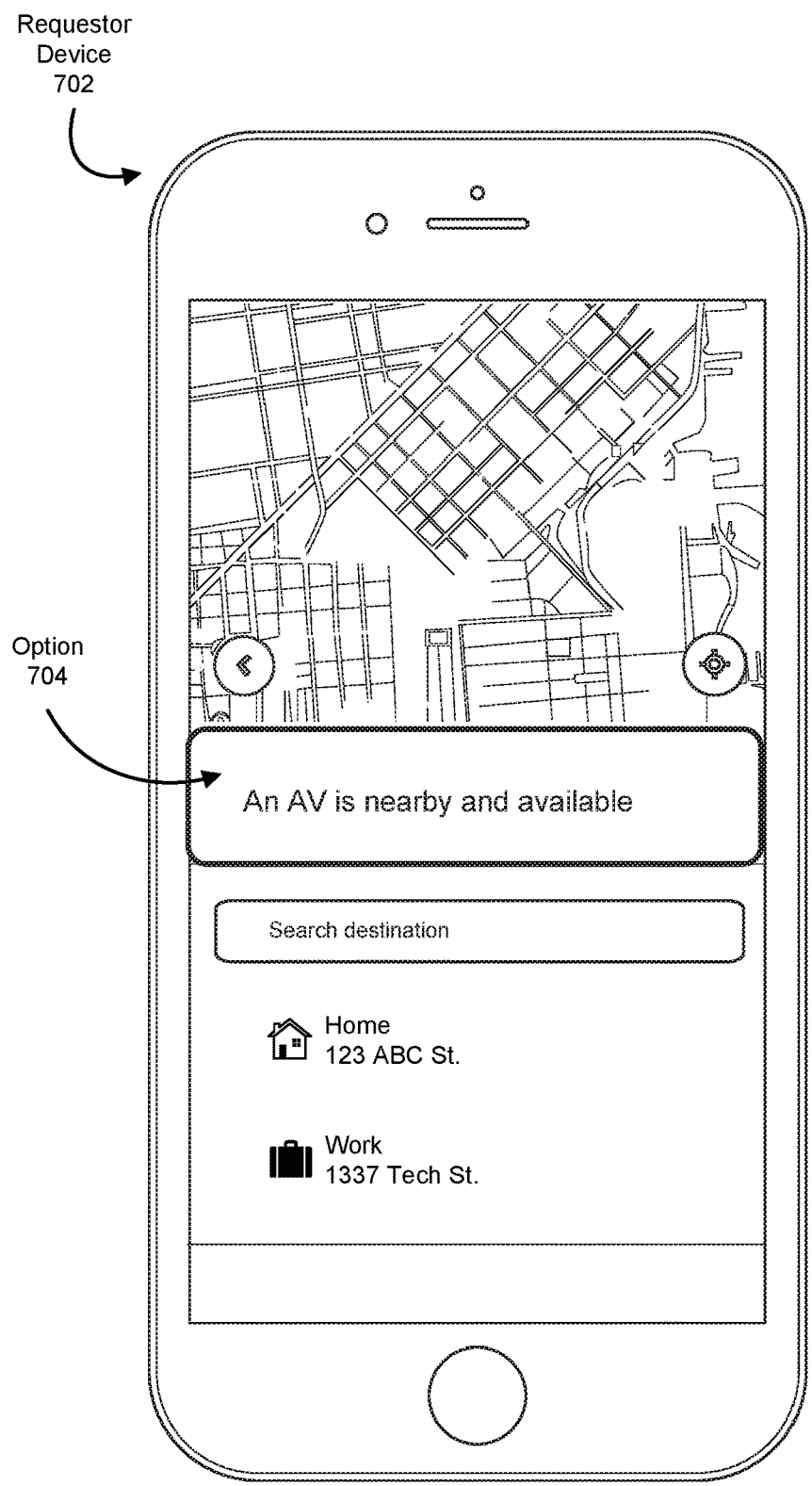
FIG. 7 is an illustration of an example interface for selecting an autonomous transportation provider.

In some embodiments, the systems described herein may cause a device to display an option to select an AV as soon as a potential requestor opens the transportation application. FIG. 7 illustrates an example interface for selecting an AV as a transportation provider. As illustrated in FIG. 7, the systems described herein may display an option 704 to be transported by an AV on a requestor device 702 before a destination has been selected via requestor device 702. In some embodiments, if all nearby AVs are matched with other transportation requestors, travel out of pickup range, or otherwise become unavailable before the transportation requestor completes the AV matching flow, the systems described herein may display a notification that AVs are currently unavailable or the option 704 may disappear from the display once the AV has been matched or is no longer eligible for the potential requestor.

Figure 8:
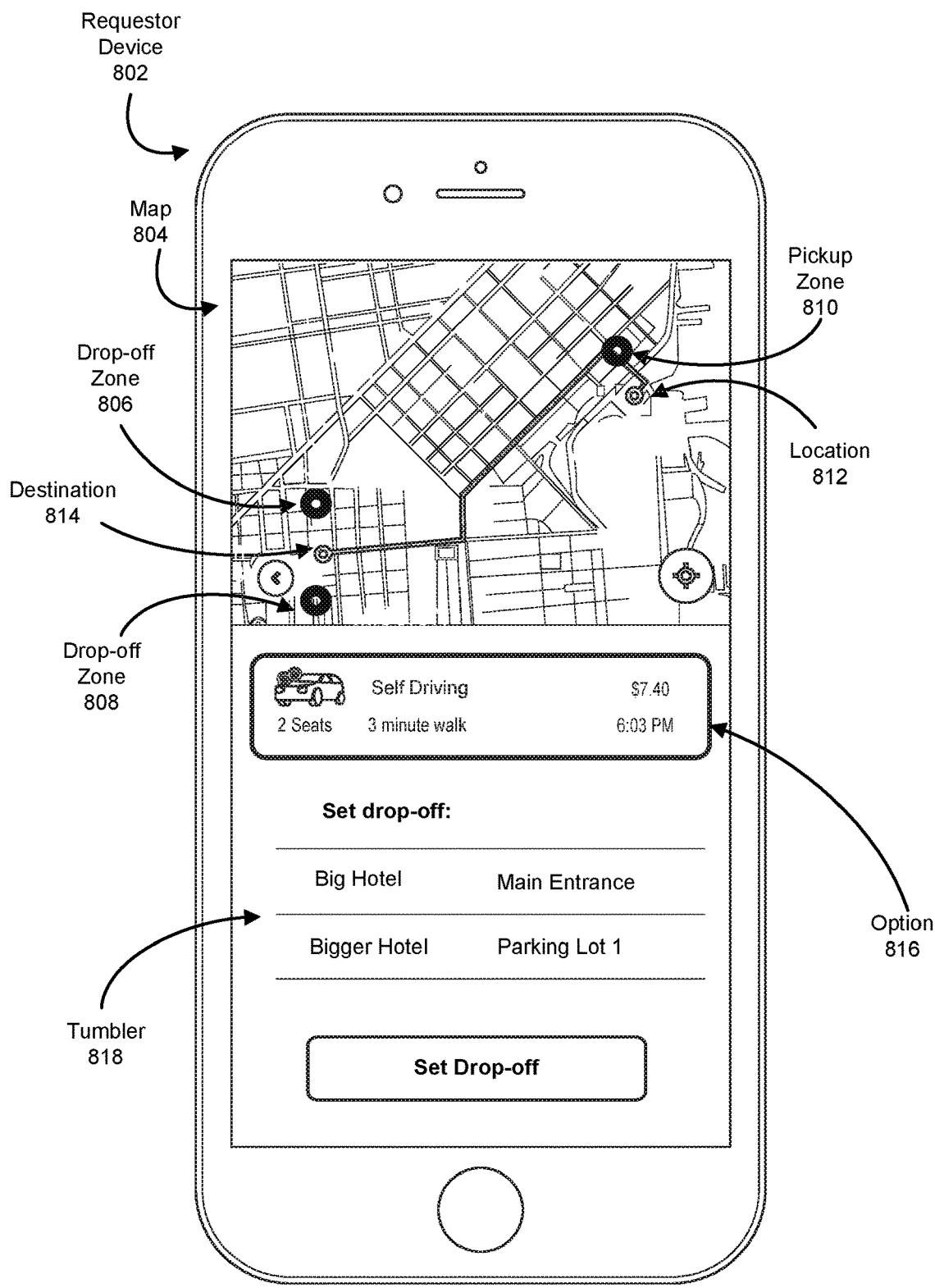
FIG. 8 is an illustration of an additional example interface for selecting an autonomous transportation provider.

Additionally or alternatively, the systems described herein may display a map and/or a list of drop-off zones. FIG. 8 illustrates an additional example interface for selecting an autonomous transportation provider. In some examples, the systems described herein may cause a requestor device 802 to display a map 804 that may include features such as a pickup zone 810 near a location 812 of requestor device 802, and/or a drop-off zone 806 and/or 808 near a destination 814 (predicted or previously selected) of the transportation requestor. In some embodiments, the systems described herein may cause requestor device 802 to display an option 816 to select an AV. In some examples, option 816 may include an ETA to meet the AV, an ETA to the destination, the cost of being transported by the AV, and/or any other relevant information. In some embodiments, the systems described herein may cause requestor device 802 to display a tumbler 818 with potential drop-off zones. In some embodiments, tumbler 818 may be a single-part tumbler that lists drop-off zones. In other embodiments, tumbler 818 may be a double-part (or multi-part) tumbler that organizes drop-off zones by location. For example, tumbler 818 may list multiple hotels that each feature multiple drop-off zones. Additionally or alternatively, the systems described herein may enable the transportation requestor to select a drop-off zone via clicking on a location on map 804. In some embodiments, the systems described herein may enable a transportation requestor to zoom and/or scroll on map 804 and may change the drop-off zones featured in tumbler 818 to those currently displayed on map 804. In some examples, the systems described herein may display an icon on map 804 showing the location of the drop-off zone currently selected in tumbler 818. In some embodiments, if the requestor device is currently located within a drop-off zone, the systems described herein may exclude that drop-off zone from the list of drop-off zones displayed.

Figure 9:
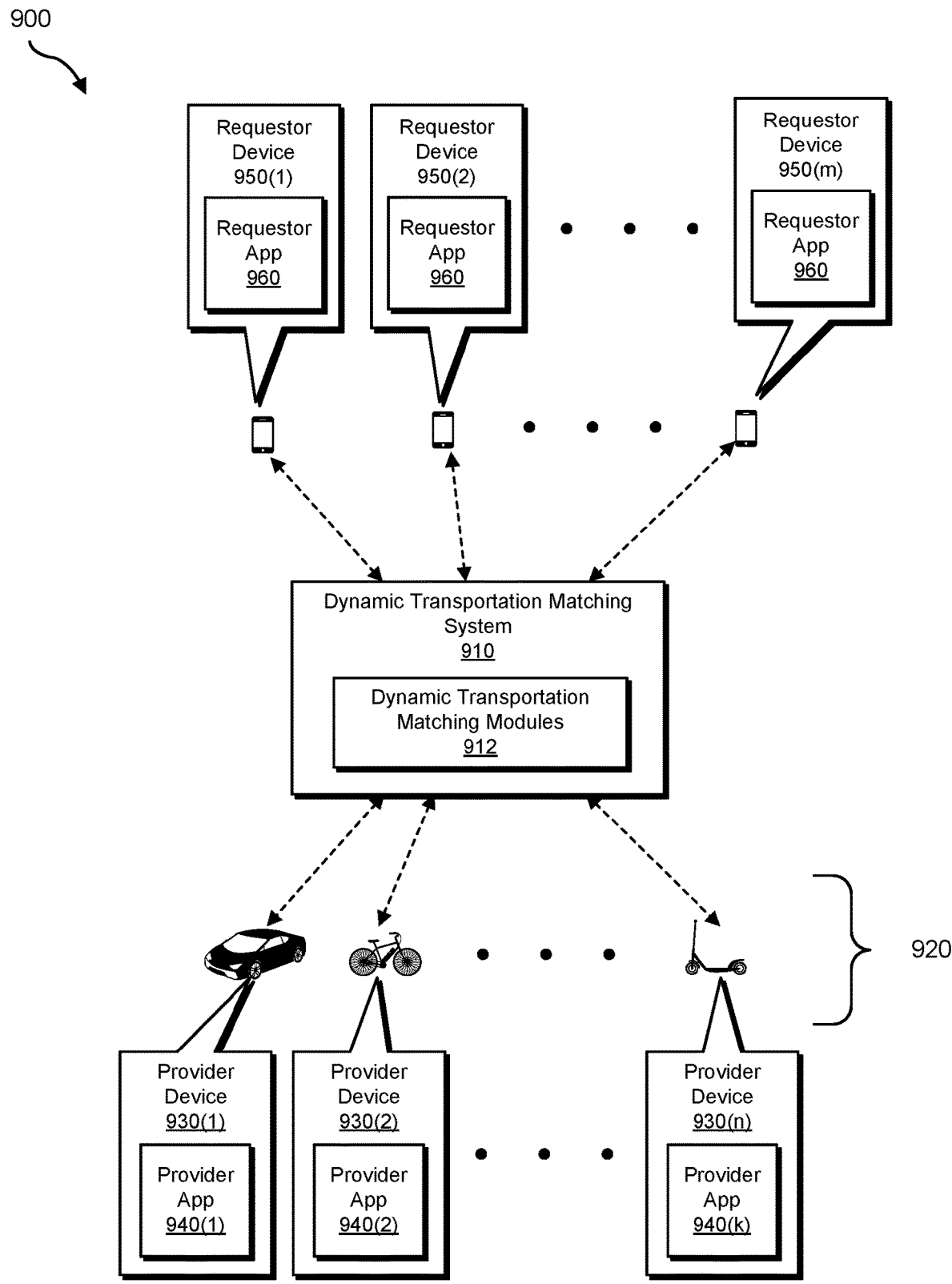
FIG. 9 is a block diagram of an example dynamic transportation management system.

FIG. 9 illustrates an example system 900 for matching transportation requests with a dynamic transportation network that includes MMVs. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include lane-bound vehicles and MMVs. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 9 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(n) (e.g., whether integrated into the vehicle, permanently affixed to the vehicle, temporarily affixed to the vehicle, worn by a driver of the vehicle, etc.). In some examples, provider devices 930 may include a provider apps 940(1)-(k). Provider apps 940(1)-(k) may represent any application, program, and/or module that may provide one or more services related to operating a vehicle and/or providing transportation matching services. For example, provider apps 940(1)-(k) may include a transportation matching application for providers and/or one or more applications for matching MMVs with requestor devices. In some embodiments, different types of provider vehicles may be provisioned with different types of provider devices and/or different provider applications. For example, MMVs may be provisioned with provider devices that are configured with a provider application that enables transportation requestors to reserve and/or operate the MMVs while road-constrained and/or lane-bound vehicles (e.g., cars) may be provisioned with provider devices that are configured with a provider application that enables provider vehicle operators (e.g., transportation providers) to respond to requests from transportation requestors. In some examples, provider applications 940(1)-(k) may match the user of provider apps 940(1)-(k) (e.g., a transportation provider) with transportation requestors through communication with dynamic transportation matching system 910. In addition, and as is described in greater detail below, provider apps 940(1)-(k) may provide dynamic transportation management system 910 with information about a provider (including, e.g., the current location of the provider and/or vehicle) to enable dynamic transportation management system 910 to provide dynamic transportation matching and/or management services for the provider and one or more requestors. In some examples, provider apps 940(1)-(k) may coordinate communications and/or a payment between a requestor and a provider. According to some embodiments, provider apps 940(1)-(k) may provide a map service, a navigation service, a traffic notification service, and/or a geolocation service.

Additionally, as shown in FIG. 9, dynamic transportation matching system 910 may communicate with requestor devices 950(1)-(m). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, a micro-mobility service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 10:
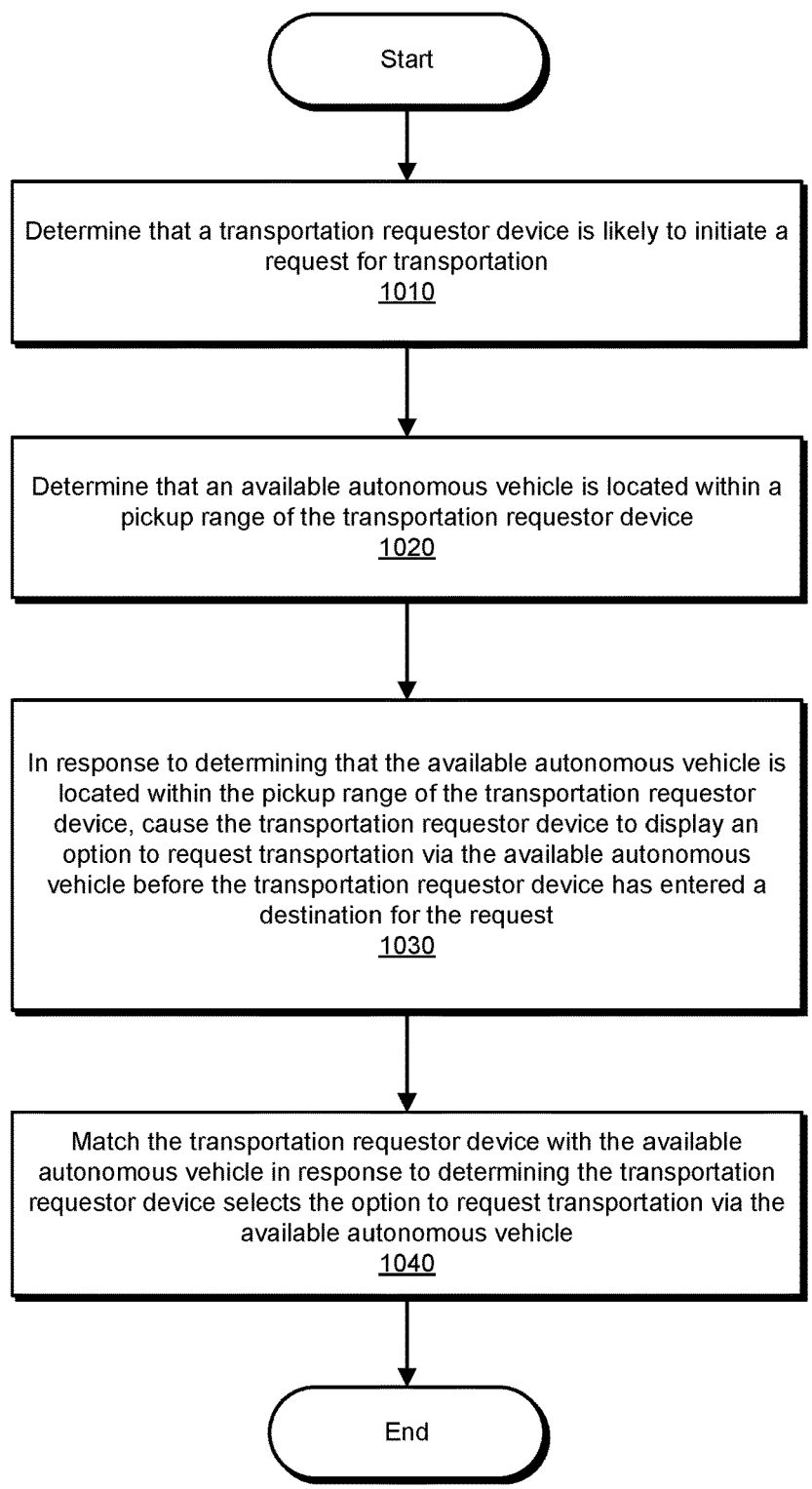
FIG. 10 is a flow diagram of an example method for matching transportation requestors with autonomous vehicles.

FIG. 10 illustrates an example computer-implemented method 1000 for matching potential transportation requestors with AVs. As shown in FIG. 10, at step 1010, one or more of the systems described herein may determine that a transportation requestor device is likely to initiate a request for transportation. At step 1020, one or more of the systems described herein may determine that an available autonomous vehicle is located within a pickup range of the transportation requestor device.

At step 1030, one of more of the systems described herein may, in response to determining that the available autonomous vehicle is located within the pickup range of the transportation requestor device, cause the transportation requestor device to display an option to request transportation via the available autonomous vehicle before the transportation requestor device has entered a destination for the request. In some examples, the systems described herein may cause the transportation requestor device to display the option to request transportation via the autonomous vehicle by causing the transportation requestor device to display an option to select a drop-off zone associated with the autonomous vehicle. In some examples, cause the transportation requestor device to displaying module may cause the transportation requestor device to display the option to request transportation via the autonomous vehicle by causing the transportation requestor device to display an option to select a pickup zone associated with the autonomous vehicle. In some embodiments, the systems described herein may cause the transportation requestor device to display the option to select the pickup zone by (i) determining that the transportation requestor device is not located within a pickup zone associated with the autonomous vehicle, (ii) determining, based on at least one characteristic of the transportation requestor device, to cause the transportation requestor device to display the option to request transportation via the autonomous vehicle despite the transportation requestor device not being located within the pickup zone, and (iii) cause the transportation requestor device to displaying a list of pickup zones within a predicted acceptable travel distance of the transportation requestor device.

In one embodiment, the systems described herein may predict, based at least in part on a transportation history of the transportation requestor device, an expected destination and cause the transportation requestor device to display the option to select transportation via the autonomous vehicle in response to determining that a drop-off zone of the autonomous vehicle is within a predicted acceptable travel distance of the expected destination. In some embodiments, the systems described herein may calculate a probability that the transportation requestor device will select the option to select transportation via the autonomous vehicle and cause the transportation requestor device to display the option to select transportation via the autonomous vehicle in response to determining that the probability that the transportation requestor will select the option exceeds a predetermined threshold. For example, the systems described herein may display the option if the probability exceeds 20%, exceeds 50%, or exceeds 80%. In some embodiments, the threshold may vary based on autonomous vehicle availability. For example, if few autonomous vehicles are available the threshold may be 90%, while if many autonomous vehicles are available, the threshold may be 30%.

At step 1040, one or more of the systems described herein may match the transportation requestor device with the available autonomous vehicle in response to determining the transportation requestor device selects the option to request transportation via the available autonomous vehicle. Additionally or alternatively, the systems described herein may (i) receive, from the transportation requestor device, a request for transportation to a destination, (ii) display a set of transportation options for transport via non-autonomous vehicles to the transportation requestor in response to receiving the request for transportation to the destination, and (iii) match the transportation requestor device with a non-autonomous vehicle in response to the transportation requestor device selecting an option to be transported via a non-autonomous vehicle.

Figure 11:
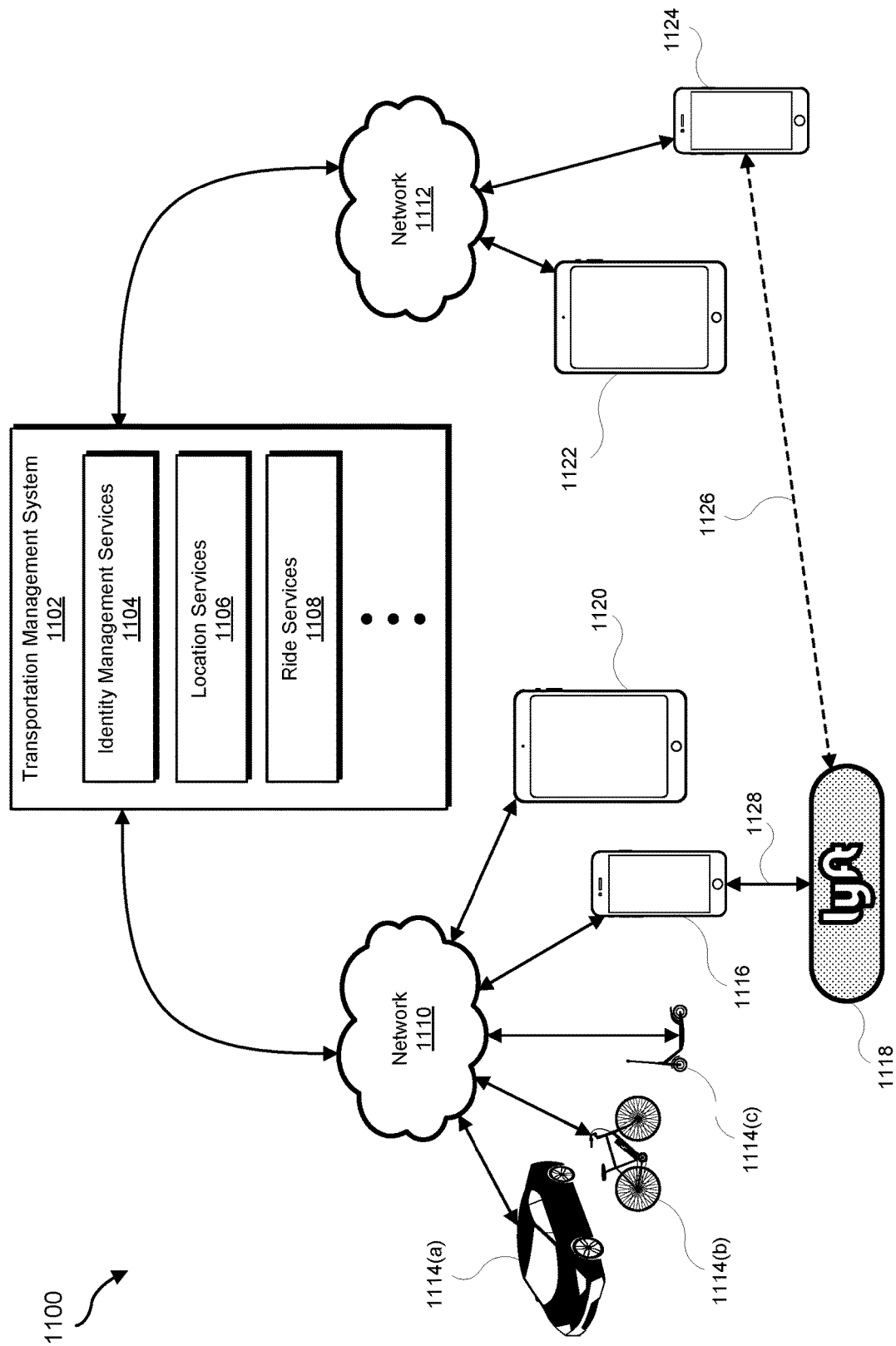
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(a), 1114(b), and/or 1114(c); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services 1104 has authenticated the identity a ride requestor, ride services 1108 may attempt to match the requestor with one or more ride providers. In some embodiments, ride services 1108 may identify an appropriate provider using location data obtained from location services 1106. Ride services 1108 may use the location data to identify providers who are geographically close to the requestor (e.g., within a certain threshold distance or travel time) and/or who are otherwise a good match with the requestor. Ride services 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
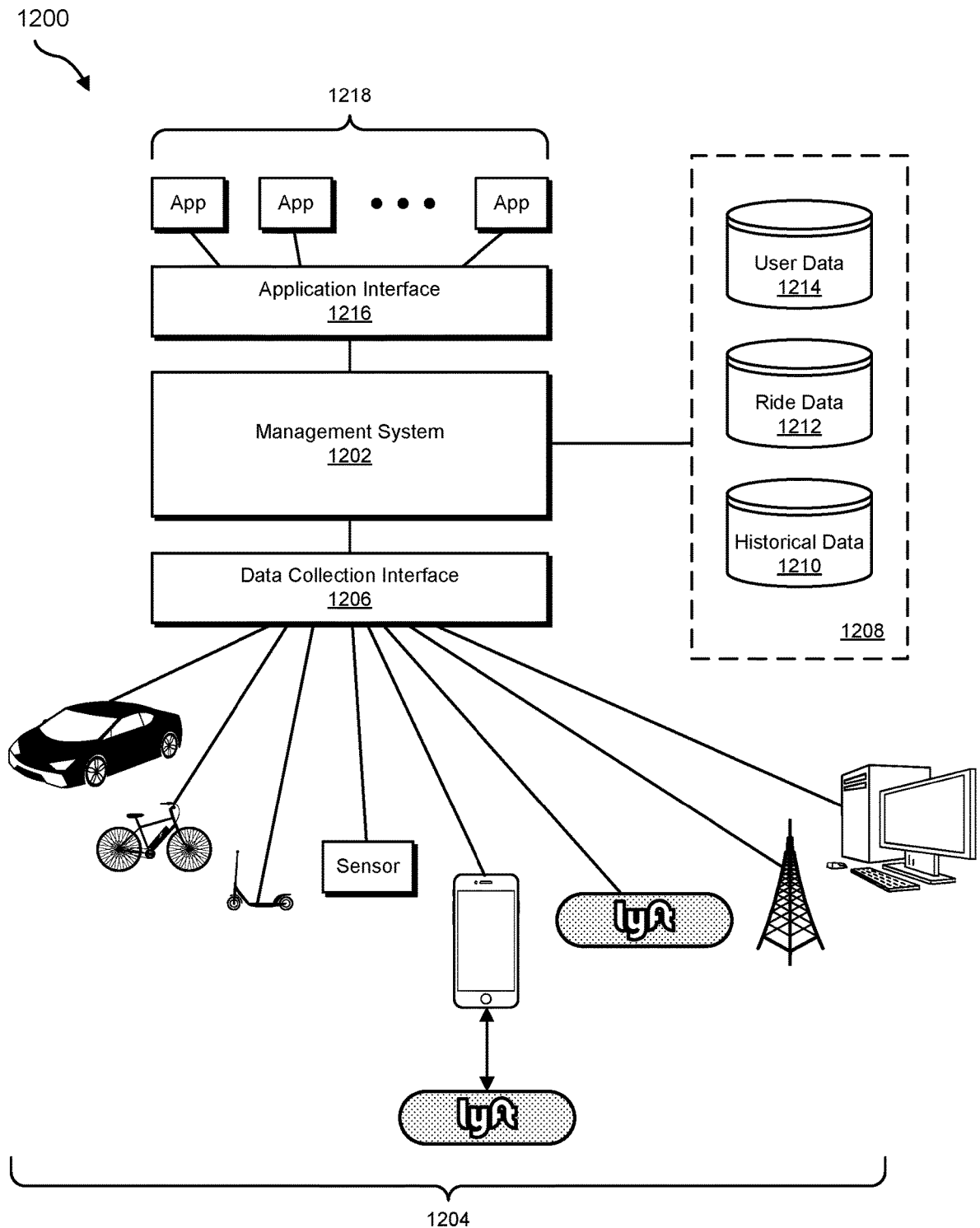
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data 1208. Data 1208 may include one or more data stores, such as databases, object storage systems and services, cloud-based storage services, and other data stores. For example, various data stores may be implemented on a non-transitory storage medium accessible to management system 1202, such as historical data 1210, ride data 1212, and user data 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a non-transitory memory; and
one or more hardware processors configured to execute instructions from the non-transitory memory to perform operations comprising:
  determining a request for transportation of a requestor associated with a requestor device to travel to a destination;
  determining a level of interest of the requestor to travel to the destination using an autonomous vehicle (AV);
  determining that a location associated with the transportation requestor is outside of an AV pickup zone within which the AV is permitted to pick up the requestor;
  based on the determined level of interest of the requestor meeting a minimum threshold level of interest, calculating a distance for the requestor to travel to reach the AV pickup zone from the location;
  providing routing instructions to the requestor device that direct the requestor to reach the AV pickup zone from the location, the routing instructions including the calculated distance for the requestor to reach the AV pickup zone; and
  providing instructions to the AV to travel to the AV pickup zone, the instructions including autonomous navigation system commands that direct the AV to autonomously navigate to the AV pickup zone, wherein the AV executes the autonomous navigation system commands to navigate to the AV pickup zone.

2. The system of claim 1, wherein the operations further include matching the requestor device with the AV in response to receiving, from the requestor device, an indication that an option to request transportation via the AV was selected.

3. The system of claim 2, wherein the operations further include notifying the requestor that the AV is en route to the AV pickup zone.

4. The system of claim 3, wherein the AV pickup zone is selected from a set of one or more eligible AV pickup zones.

5. The system of claim 2, wherein, upon matching the requestor with the AV, the operations further include reserving the AV for the requestor.

6. The system of claim 1, wherein the operations further include:
  determining that a rideable vehicle is within a specified distance of the transportation requestor; and
  providing routing instructions to the requestor device that direct the requestor to reach the rideable vehicle for traveling to the AV pickup zone.

7. The system of claim 6, wherein the specified distance comprises a predicted acceptable travel distance for reaching the AV pickup zone based upon the level of interest.

8. The system of claim 6, wherein the operations further include reserving the rideable vehicle for the transportation requestor.

9. The system of claim 1, wherein the operations further include:
  selecting a mode of transportation from a plurality of modes of transportation that are within a specified distance of the transportation requestor; and
  providing routing instructions to the requestor device that direct the requestor to travel to the specified distance to the AV pickup zone using the selected mode of transportation.

10. The system of claim 9, wherein the selected mode of transportation is a public transit vehicle, and the operations further include reserving a seat on the public transit vehicle.

11. The system of claim 1, wherein the operations further include causing the requestor device to display a plurality of different AV pickup zones within a predicted acceptable travel distance of the requestor device.

12. The system of claim 11, wherein the predicted acceptable travel distance is enlarged upon determining that the transportation requestor is willing to travel to the AV pickup zone.

13. A computer-implemented method comprising:
  determining a request for transportation of a requestor associated with a requestor device to travel to a destination;
  determining a level of interest of the requestor to travel to the destination using an autonomous vehicle (AV);
  determining that a location associated with the transportation requestor is outside of an AV pickup zone within which the AV is permitted to pick up the requestor;
  based on the determined level of interest of the requestor meeting a minimum threshold level of interest, calculating a distance for the requestor to travel to reach the AV pickup zone from the location;
  providing routing instructions to the requestor device that direct the requestor to reach the AV pickup zone from the location, the routing instructions including the calculated distance for the requestor to reach the AV pickup zone; and
  providing instructions to the AV to travel to the AV pickup zone, the instructions including autonomous navigation system commands that direct the AV to autonomously navigate to the AV pickup zone, wherein the AV executes the autonomous navigation system commands to navigate to the AV pickup zone.

14. The computer-implemented method of claim 13, further comprising matching the requestor device with the AV in response to receiving, from the requestor device, an indication that an option to request transportation via the AV was selected.

15. The computer-implemented method of claim 14, further comprising notifying the requestor that the AV is en route to the AV pickup zone.

16. The computer-implemented method of claim 15, wherein the AV pickup zone is selected from a set of one or more eligible AV pickup zones.

17. The computer-implemented method of claim 14, further comprising, upon matching the requestor with the AV, reserving the AV for the requestor.

18. The computer-implemented method of claim 13, further comprising:
  determining that a rideable vehicle is within a specified distance of the transportation requestor; and
  providing routing instructions to the requestor device that direct the requestor to reach the rideable vehicle for traveling to the AV pickup zone.

19. The computer-implemented method of claim 18, wherein the specified distance comprises a predicted acceptable travel distance for reaching the AV pickup zone based upon the level of interest.

20. A computer-readable medium comprising computer-readable instructions that, when executed by at least one processor of a computing device, cause the computing device to:
- determine a request for transportation of a requestor associated with a requestor device to travel to a destination;
- determine a level of interest of the requestor to travel to the destination using an autonomous vehicle (AV);
- determine that a location associated with the transportation requestor is outside of an AV pickup zone within which the AV is permitted to pick up the requestor;
- based on the determined level of interest of the requestor meeting a minimum threshold level of interest, calculate a distance for the requestor to travel to reach the AV pickup zone from the location;
- provide routing instructions to the requestor device that direct the requestor to reach the AV pickup zone from the location, the routing instructions including the calculated distance for the requestor to reach the AV pickup zone; and
- provide instructions to the AV to travel to the AV pickup zone, the instructions including autonomous navigation system commands that direct the AV to autonomously navigate to the AV pickup zone, wherein the AV executes the autonomous navigation system commands to navigate to the AV pickup zone.

* * * * *